US006745407B1

(12) United States Patent
Van Acker, Jr.

(10) Patent No.: US 6,745,407 B1
(45) Date of Patent: Jun. 8, 2004

(54) SYSTEMS AND METHODS FOR WASTE DISPOSAL FOR USE IN A VEHICLE

(76) Inventor: Henry Van Acker, Jr., 58 State St., #7, Rouse's Point, NY (US) 12979

( * ) Notice: Subject to any disclaimer, the term of this patent is extended or adjusted under 35 U.S.C. 154(b) by 0 days.

(21) Appl. No.: 10/315,387

(22) Filed: Dec. 10, 2002

(51) Int. Cl.[7] .............................................. A47K 11/02
(52) U.S. Cl. .............................. 4/111.4; 4/111.1; 4/319; 4/323
(58) Field of Search ................. 4/319–323, 111.1–111.4; 210/104, 131, 149, 173, 175, 251, 295, 908

(56) References Cited

U.S. PATENT DOCUMENTS

| | | | | |
|---|---|---|---|---|
| 3,775,978 A | * | 12/1973 | Body ........................... | 4/111.1 |
| 3,882,799 A | * | 5/1975 | Sargent et al. ............... | 4/111.1 |
| 3,925,827 A | * | 12/1975 | Wagenhals .................. | 210/251 |
| 3,933,636 A | * | 1/1976 | Daniels ........................ | 4/111.2 |
| 3,956,126 A | * | 5/1976 | Streebin et al. .............. | 4/111.1 |
| 4,161,792 A | | 7/1979 | Dallen et al. ................. | 4/111.1 |
| 4,162,656 A | | 7/1979 | Dallen et al. ................ | 110/221 |
| 5,020,321 A | * | 6/1991 | Lord ............................ | 4/111.1 |
| 6,106,703 A | * | 8/2000 | Nassef ........................ | 210/104 |

* cited by examiner

Primary Examiner—Tuan N. Nguyen
(74) Attorney, Agent, or Firm—Heslin Rothenberg Farley & Mesiti P.C.; Victor A. Cardona

(57) ABSTRACT

A system for waste disposal for use in a vehicle includes a holding tank for receiving waste and a separator for receiving the waste from the holding tank with the separator being configured to separate the waste into a liquid portion and a solid portion. A macerator receives the solid portion from the separator and macerates the solid portion. Further included is an engine for providing power to the vehicle and being configured to receive and incinerate the solid portion.

16 Claims, 2 Drawing Sheets

SYSTEMS AND METHODS FOR WASTE DISPOSAL FOR USE IN A VEHICLE

TECHNICAL FIELD

This invention relates, in general, to waste disposal and, in particular, to systems and methods for waste disposal for use in vehicles.

BACKGROUND ART

Boats over 65 feet in length are required by the U.S. Coast Guard to include toilet facilities thereon. Also, it is desirable to prevent waste, e.g. excrement, from uncontrollably entering waterways due to the potential for environmental contamination and the possibility of sickness and disease being caused to humans. Often, the solution to such problems is to provide a holding tank to maintain the wastes securely until a boat returns to port. However, such holding tanks add additional weight and occupy valuable space on the boat otherwise more preferably utilized for other purposes. Moreover, a loss of resources results when waste is discarded which might otherwise be used for productive purposes, such as powering the boat. The issues described apply equally to waste disposal for other vehicles such as recreational vehicles and campers.

Thus, a need exists for a system for disposing of waste, which minimizes the amount of space it occupies on a boat or other vehicle while preventing environmental contamination and conserving resources.

SUMMARY OF THE INVENTION

The present invention provides, in a first aspect, a waste disposal system for use in a vehicle, which includes a holding tank for receiving waste and a separator for receiving the waste from the holding tank with the separator being configured to separate the waste into a liquid portion and a solid portion. The system further includes a macerator for receiving and macerating the solid portion received from the separator. An engine is included for providing power to the vehicle and which is configured to receive and incinerate the solid portion.

The present invention provides, in a second aspect, a waste disposal system for use in a vehicle, which includes a holding tank for receiving waste and a separator for receiving the waste from the holding tank with the separator being configured to separate the waste into a liquid portion and a solid portion. Further included is an engine for providing power to the vehicle and an evaporator for receiving a liquid portion. The evaporator is thermally coupled to the engine for evaporating the liquid portion, when the liquid portion is received in the evaporator.

The present invention provides, in a third aspect, a waste disposal method for use in a vehicle, which includes separating waste into a solid portion and a liquid portion at a separator and macerating the solid portion at a macerator. The method further includes receiving the solid portion at an engine and incinerating the solid portion and/or fuel in an internal combustion process of the engine.

The present invention provides, in a fourth aspect, a waste disposal method for use in a vehicle which includes separating waste into a solid portion and a liquid portion in a separator and generating heat by an engine to power the vehicle. The method further includes receiving the liquid portion at an evaporator thermally coupled to the engine and evaporating the liquid portion using heat from the engine.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

DETAILED DESCRIPTION

In accordance with the principles of the present invention, systems and methods for waste disposal for use in a vehicle are provided.

Figure 1:
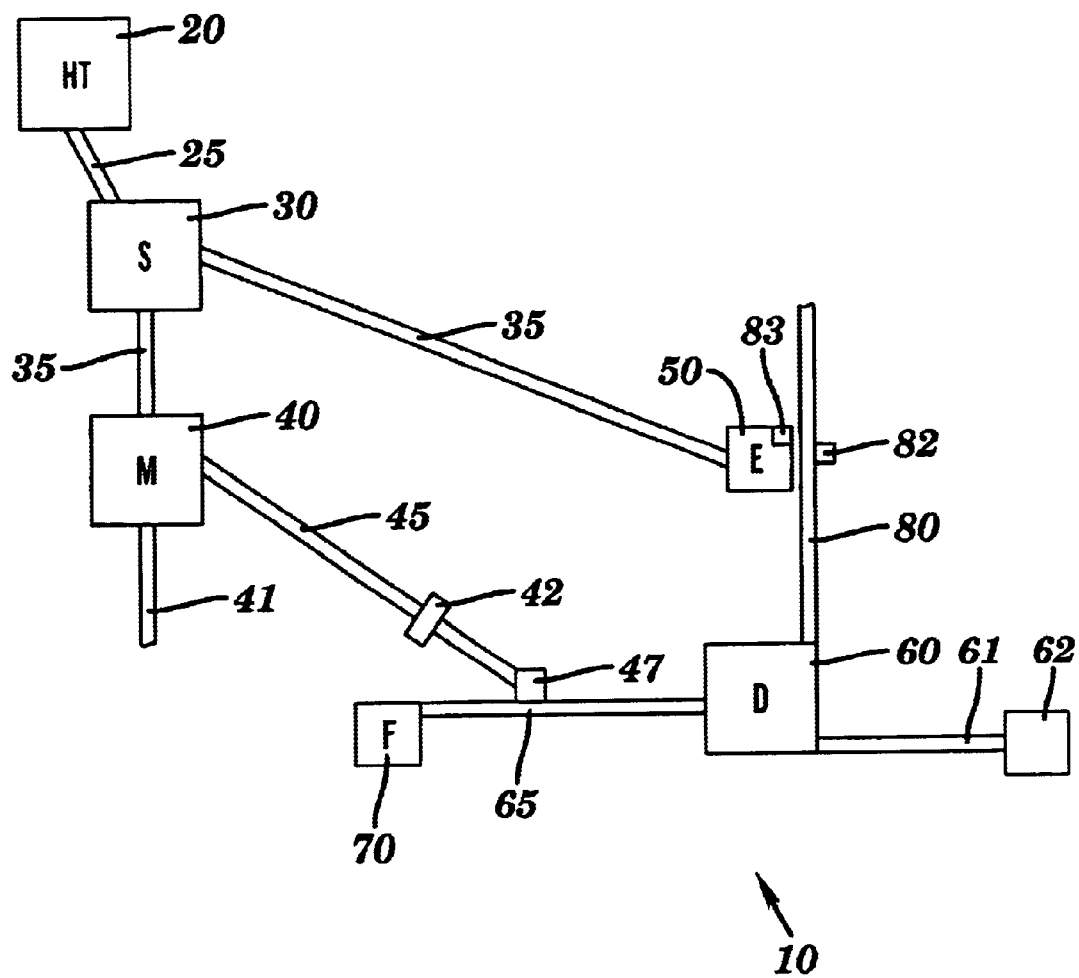
FIG. 1 is a block diagram of a waste disposal system for use on a boat in accordance with the present invention.

In an exemplary embodiment depicted in FIG. 1, a system 10 for incinerating waste on a boat is provided. A holding tank 20 is in fluid communication with a separator 30 via a holding tank conduit 25. A separator 30 is in fluid communication with a macerator 40 and an evaporator 50. A diesel engine 60 drives a drive shaft 61 coupled to propeller 62 or other means for moving the boat and is connected to a fuel source 70, e.g., a diesel fuel tank, via a fuel conduit 65. Macerator 40 is connected to fuel conduit 65 via a macerator conduit 45. Diesel engine 60 has an exhaust conduit 80 to carry exhaust from a combustion process away from diesel engine 60.

Holding tank 20 may receive waste from a toilet or other receptacle for receiving such waste. The waste may then be transferred or pumped to separator 30 via holding tank conduit 25 with, for example, a pump (not shown) located in holding tank 20, separator 30, or holding tank conduit 25, or outside thereof. The waste is separated into a liquid portion and a solid portion in separator 30. The solid portion is then pumped to macerator 40 via a separator conduit 35 by a pump (not shown) located in separator 30, separator conduit 35, or macerator 40, or outside thereof. The solid portion may be transformed in macerator 40 into a flowable liquid by being chopped up, blended or otherwise liquefied. Such macerated solid portion may then be pumped or otherwise sent via macerator conduit 45 to fuel conduit 65 and/or directly to diesel engine 60. A flow control valve 47 may be provided at the intersection of macerator conduit 45 and fuel conduit 65 to regulate an amount of macerated solid provided to fuel conduit 65. For example, valve 47 may prevent flow from macerator 40 to fuel conduit 65 during a warm-up period after diesel engine 60 has been initially started up.

When diesel engine 60 has warmed up sufficiently, valve 47 may open to allow flow of macerated solid material to fuel conduit 65 and thus flow of a macerated solids-fuel mixture to diesel engine 60. Further, valve 47 may regulate the amount of the solid portion provided to fuel conduit 65 to achieve an optimum ratio of one to the other to ensure proper operation and/or a desired operating temperature of diesel engine 60.

The macerated solid portion of the waste is thus provided to diesel engine 60 through fuel conduit 65 such that it is burned or incinerated in the internal combustion process of diesel engine 60, which produces power for moving propeller 62 or other means for providing motion to the boat. Diesel engine 60 may also provide power for other needs of the boat, such as lights, pumps, or electronics. The mixing of the waste (e.g., the macerated solid portion) with the diesel fuel thereby incinerating it may also reduce the size, or necessity of, holding tank 20 while providing additional fuel (e.g., macerated solids) to diesel engine 60. Specifically, because the waste is incinerated, it is not necessary to store the same quantity thereof on the boat in such a holding tank and thus less storage capacity (e.g. a smaller holding tank) may be required. Further, the supplementation of the diesel fuel with the macerated solids may provide a cost savings by allowing less diesel fuel to be used. Specifically, the fluid being combusted in diesel engine 60 is a macerated solids-fuel mixture instead of pure diesel fuel.

Macerator 40 may further include an exit conduit 41 to allow any excess macerated solid portion to be discharged therefrom. A macerated solids-flow control valve (not shown) may regulate the flow of macerated solid portion through exit conduit 41 in response to an excess amount of macerated solid portion being present in macerator 40. Such excess macerated solid portion may be discharged to holding tank 20 or another structure for holding such macerated solid portion.

In another example, a mixing tank (not shown) may be provided at the intersection of macerator conduit 45 and fuel conduit 65 to allow the macerated solid portion and the fuel to be thoroughly mixed prior to such mixture being sent to diesel engine 60. This mixing chamber may also include an agitator (not shown) or other means for mixing the fuel with the macerated solid portion. Such mixing chamber may also be located down stream of flow control valve 47 thus allowing control of the flow thereto. In a further embodiment, macerator 40 may act as a mixing tank by receiving fuel from fuel tank 70 during the macerating of the solid portion.

The liquid portion, separated from the solid portion in separator 30, may be sent via an evaporator conduit 35 to evaporator 50 which may abut or may be near exhaust conduit 80 of diesel engine 60. Evaporator 50 may be an open container made of a thermally conductive material to allow the contents thereof, i.e. liquid waste, to receive heat and evaporate. As will be evident, exhaust from diesel engine 60 passing through exhaust conduit 80 is heated because it is the byproduct of the internal combustion of diesel engine 60. Thus, by placing evaporator 50 adjacent exhaust conduit 80 or otherwise thermally coupling them, the heat therefrom may be utilized to heat the liquid portion contained in evaporator 50 to cause evaporation thereof. As will be understood by those skilled in the art, evaporator 50 may be thermally coupled to different heat-generating portions of diesel engine 60 other than exhaust conduit 80 to result in such liquid portion being evaporated. In another example, evaporator 50 may be integral to exhaust conduit 80 or evaporator 50 may be eliminated with exhaust conduit 80 receiving the liquid portion from evaporator conduit 35.

Flow control valves (e.g., flow control valve 47) may be placed at various points within system 10 to control flow of wastes, liquid portions, solid portions, fuel and/or fuel-waste mixtures. Such valves may be manually controlled by the user or may be coupled to a computing unit (not shown) to allow optimal incineration of the wastes in diesel engine 60 without inhibiting the primary function thereof, i.e. providing power to the boat. Sensors coupled to such a computing unit may be provided within, or mounted to, the various conduits or components to further enable optimal incineration of the wastes. Such sensors could include flow meters, temperature sensors, oxygen sensors, and other such devices, as will be understood by those skilled in the art. Such sensors may also provide direct information to a user via a display screen, gauge or other such means without being coupled to a computing unit. For example, an exhaust conduit temperature sensor 82 may be provided adjacent to, or mounted on, evaporator 50 to enable a user to monitor such temperature. Also a level indicator 83 may be mounted on evaporator 50 to detect an amount of liquid therein. If level indicator 83 detects an excess amount of liquid in evaporator 50 due to a low temperature of exhaust conduit 80 or temperature sensor 82 detects such a low temperature, flow control valve 47 may reduce an amount of macerated solid waste being provided to fuel conduit 65. Such a decrease in macerated solid waste being sent to diesel engine 60 may cause an increase in temperature of diesel engine 60. Thus, a temperature of exhaust conduit 80 may be increased thereby causing such excess liquid portion in evaporator 50 to be evaporated.

Filters may be included at various points within the system, such as a macerator filter 42 in macerator conduit 45 between macerator 40 and fuel conduit 65. Such filters may prevent or inhibit undesirable materials from being conveyed to diesel engine 60 which may damage it or negatively affect its operation. The various valves may also include backflow preventers to inhibit flow from backing up in the various conduits. Further, pressure gauges may be included at various points within system to measure the pressure (e.g. fluid pressure) therein.

The various pumps described above may instead be replaced by a gravity system, which eliminates the need for such pumping, and as will be understood by those skilled in the art, diesel engine 60 could be any of various types, which are utilized to power a boat. Further the systems described above could be utilized for various vehicles for which it is desired to minimize weight and conserve space, for example, recreational vehicles and campers. Separator 30 could be any of various types, which are usable to separate liquid and solid portions of waste. Further, holding tank 20, separator 30, and/or macerator 40 could be integral to each other.

Figure 2:
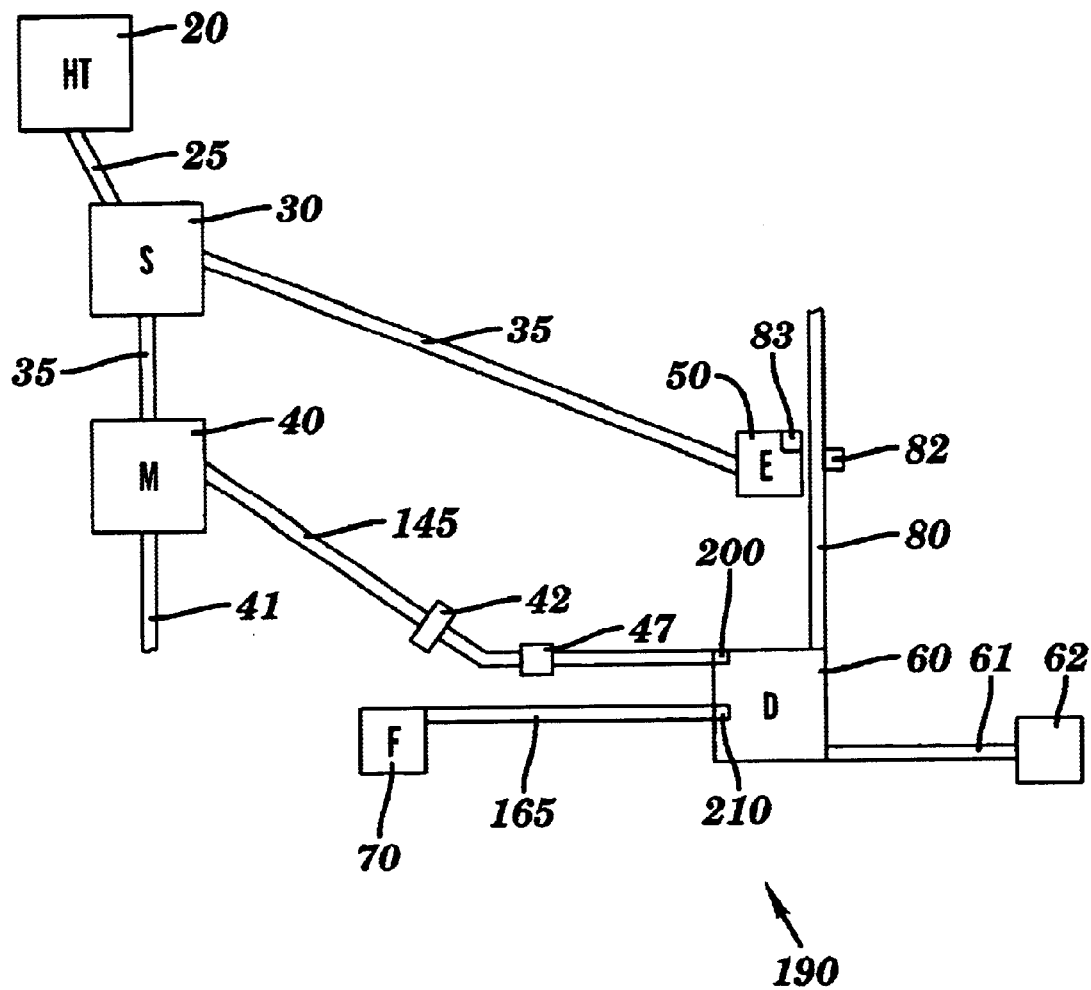
FIG. 2 is a block diagram of a second embodiment of a waste disposal system for use on a boat in accordance with the present invention.

Further, the macerated solid portion and fuel may be provided to diesel engine 60 via separate input points in another embodiment of a system 190 for waste disposal in a vehicle as depicted in FIG. 2. For example, diesel engine 60 play include a fuel injector 210 and a macerated solid portion injector 200 for injecting the fuel and macerated solid portion into diesel engine 60 during an internal combustion process. Fuel injector 210 may be connected to fuel tank 70 via a fuel conduit 165 while macerated solid injector 200 may be connected to macerator 40 via a macerator conduit 145. These injectors may be controlled via a control valve(s) controlled by a user (e.g., control valve 47) or controlled by a computing unit coupled to such a control valve(s). The use of separate injectors for the fuel and the macerated solid portion allows the macerated solid portion to be injected into the internal combustion process when diesel engine 60 is operated at an operating temperature sufficient to incinerate the macerated solid portion without adversely affecting the performance of diesel engine 60. When diesel engine 60 is not operating at a sufficient temperature, flow of the macerated solid portion may be stopped thereby allowing only fuel to be provided to diesel engine 60.

An example of a method for waste disposal for use in a vehicle is described as follows. Waste may be received in holding tank 20 from a toilet. A pump (not shown) may cause the waste to be sent to separator 30 via holding tank conduit 25 where it may be separated into liquid and solid components. The solid components may be pumped to macerator 40 via separator conduit 35 and such solids may be liquefied or macerated therein. The liquefied solid components may then be sent via macerator conduit 45 to a coupling with fuel conduit 65 at control valve 47. The flow of the liquefied solid components may be regulated by control valve 47 which may be controlled by a computing unit or by a user manually. The mixture of liquefied solid components and diesel fuel may be fed to diesel engine 60 at a ratio such that diesel engine 60 may power a propeller or axle of a vehicle, for example, while incinerating the liquefied solid components.

The liquid portion of the waste flows from separator 30 via evaporator conduit 35 to evaporator 50, which is adjacent to or abuts exhaust conduit 80 or another portion of diesel engine 60. The heat of diesel engine 60 may thus cause the liquid portion to evaporate in evaporator 50. Sensor 82 may detect a temperature of exhaust conduit 80 while level indicator 83 may detect a level of liquid portion in evaporator 50. A user or computing unit (not shown) may utilize such information to regulate a flow of waste from holding tank 20 to separator 30, solid portion from separator 30 to macerator 40, macerated solid portion from macerator 40 to fuel conduit 65, fuel and macerated solid component mixture to diesel engine 60, and/or liquid portion from separator 30 to evaporator 50 via one or more flow control devices and/or pumps. For example, the flow of the liquefied solid portion to fuel conduit 65 may be regulated to insure exhaust conduit 80 is hot enough to cause evaporation of the liquid in evaporator 50 while also maintaining diesel engine 60 at a satisfactory temperature to provide power for the vehicle. Specifically, the flow of the macerated solid portion may be reduced if a liquid portion in evaporator 50 is above a certain level or if diesel engine 60 is not producing enough power to satisfy the needs of the vehicle. Such a reduction may cause an increase in the temperature of diesel engine 60 and/or allow it to perform more efficiently.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A waste disposal system for use in a vehicle, said system comprising:
    a holding tank for receiving waste;
    a separator for receiving the waste from said holding tank, said separator serving to separate the waste into a liquid portion and a solid portion;
    a macerator for receiving the solid portion from said separator and macerating the solid portion into a macerated solid portion;
    an engine for providing power to the vehicle, said engine configured to receive and incinerate the macerated solid portion; and
    wherein said engine is configured to incinerate the waste by a burning a mixture of a fuel and the macerated solid portion in an internal combustion process of said engine.

2. The system of claim 1 further comprising a valve for controlling flow of at least one of the macerated solid portion and fuel to the engine.

3. The system of claim 1 further comprising at least one flow meter for determining a rate of flow of at least one of the waste to said separator, the solid portion to said macerator, the liquid portion to an evaporator and a fuel-macerated solid portion mixture to said engine.

4. The system of claim 1 further comprising means for controlling the flow of at least one of fuel and the macerated solid portion to said engine.

5. The system of claim 1 wherein said engine further comprises an exhaust conduit.

6. The system of claim 5 further comprising an evaporator for receiving the liquid portion, said evaporator being thermally coupled to said exhaust conduit for evaporating the liquid portion received in said evaporator.

7. The system of claim 1 wherein at least two of said separator, said macerator, and said holding tank are integral to each other.

8. The system of claim 1 wherein the vehicle comprises a boat.

9. A waste disposal system for use in a vehicle, said system comprising:
    a holding tank for receiving waste;
    a separator for receiving the waste from said holding tank, said separator serving to separate the waste into a liquid portion and a solid portion;
    an engine for providing power to the vehicle; and
    an evaporator for receiving the liquid portion, said evaporator being thermally coupled to said engine for evaporating the liquid portion received in said evaporator;
    wherein said engine is configured to receive the solid portion and incinerate a mixture of the solid portion and a fuel in an internal combustion process of said engine.

10. The system of claim 9 further comprising a macerator for receiving and macerating the solid portion, said macerator being coupled to said holding tank and said engine.

11. The system of claim 9 wherein said engine comprises an exhaust conduit and said exhaust conduit is thermally coupled to said evaporator for evaporating the liquid portion received in said evaporator.

12. A waste disposal method for use in a vehicle, the method comprising:
    separating waste into a solid portion and a liquid portion in a separator;
    Macerating the solid portion at a macerator into a macerated solid portion;
    receiving the macerated solid portion at an engine; and
    incinerating a mixture of the macerated solid portion and a fuel in an internal combustion process of said engine.

13. The method of claim 12 further comprising receiving the liquid portion at an evaporator thermally coupled to said engine and evaporating at least a portion of the liquid portion using heat from said engine.

14. The method of claim 13 further comprising thermally coupling the evaporator to an exhaust pipe of said engine.

15. The method of claim 12 further comprising controlling a flow of at least one of the macerated solid portion and the fuel to the engine.

16. A waste disposal method for use in a vehicle, the method comprising:
    separating waste into a solid portion and a liquid portion in a separator;
    generating heat by an engine, when the engine is operating to power the vehicle; and
    receiving the liquid portion at an evaporator thermally coupled to the engine and evaporating at least a portion of the liquid portion using the heat from the engine wherein the generating the heat comprises internally combusting a mixture of the solid portion and a fuel.

\* \* \* \* \*